(12) United States Patent
Lucas et al.

(10) Patent No.: US 7,069,733 B2
(45) Date of Patent: Jul. 4, 2006

(54) UTILIZATION OF BOGDOWN OF SINGLE-SHAFT GAS TURBINES TO MINIMIZE RELIEF FLOWS IN BASELOAD LNG PLANTS

(75) Inventors: Clifford E. Lucas, Emmaus, PA (US); Philip A. Brochu, Allentown, PA (US); William Carl Rooney, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/630,950

(22) Filed: Jul. 30, 2003

(65) Prior Publication Data

US 2005/0022552 A1 Feb. 3, 2005

(51) Int. Cl.
*F25B 1/00* (2006.01)
(52) U.S. Cl. .................... 62/115; 62/228.1
(58) Field of Classification Search ............ 62/115, 62/613, 196.1, 196.2, 196.3, 611, 228.1, 228.3, 62/228.5; 415/1, 11
See application file for complete search history.

(56) References Cited

U.S. PATENT DOCUMENTS

| | | | | |
|---|---|---|---|---|
| 2,470,565 A | * | 5/1949 | Loss | 415/27 |
| 3,855,810 A | | 12/1974 | Simon et al. | 62/9 |
| 4,033,735 A | * | 7/1977 | Swenson | 62/612 |
| 4,203,701 A | * | 5/1980 | Abbey | 415/1 |
| 4,230,437 A | * | 10/1980 | Bellinger et al. | 415/1 |
| 4,566,885 A | | 1/1986 | Haak | 62/9 |
| 4,594,051 A | | 6/1986 | Gaston | |
| 4,799,359 A | | 1/1989 | Nicoll | 62/6 |
| 5,002,459 A | * | 3/1991 | Swearingen et al. | 415/17 |
| 5,141,389 A | | 8/1992 | Bear et al. | |
| 5,195,875 A | * | 3/1993 | Gaston | 415/27 |
| 5,319,945 A | | 6/1994 | Bartlett | 62/174 |
| 5,408,840 A | | 4/1995 | Talley | 62/126 |
| 5,689,141 A | * | 11/1997 | Kikkawa et al. | 62/613 |
| 6,324,848 B1 | * | 12/2001 | Gladden et al. | 60/612 |
| 6,394,764 B1 | * | 5/2002 | Samurin | 417/313 |
| 2002/0119050 A1 | | 8/2002 | Totsuka et al. | |

FOREIGN PATENT DOCUMENTS

| | | |
|---|---|---|
| WO | 8806674 | 7/1988 |
| WO | 9733131 | 12/1997 |

OTHER PUBLICATIONS

Zeckendorf A et al: "Design, Simulation Create Low Surge, Low Cost Gas-Injection Compressor" Oil and Gas Journal, Jan. 16, 1995; (vol. 93, No. 3) pp. 57-62, Pennwell Publishing Co. Tulsa, US.

Key B et al "Constraints Complicate Centrifugal Compressor Depressurization"; Oil and Gas Journal, May 10, 1993 (vol. 91, No. 19); pp. 50-54; Pennwell Publishing Co., Tulsa, U.

* cited by examiner

*Primary Examiner*—Cheryl Tyler
*Assistant Examiner*—Michael J. Early
(74) *Attorney, Agent, or Firm*—Willard Jones, II

(57) ABSTRACT

Gas compression system comprising a driver; a refrigerant compressor driven by the driver and having an inlet and an outlet; a relief pressure safety valve having an inlet in flow communication with the outlet of the compressor, an outlet, and a set point; and a recycle pressure safety valve having an inlet in flow communication with the outlet of the compressor, an outlet in flow communication with the inlet of the compressor, and a set point that is lower than the set point of the relief pressure safety valve.

6 Claims, 4 Drawing Sheets

UTILIZATION OF BOGDOWN OF SINGLE-SHAFT GAS TURBINES TO MINIMIZE RELIEF FLOWS IN BASELOAD LNG PLANTS

BACKGROUND OF THE INVENTION

The production of liquefied natural gas (LNG) may be achieved by cooling and condensing a feed gas stream against multiple refrigerant streams provided by recirculating refrigerant systems. Cooling of the natural gas feed may be accomplished by various cooling process cycles, such as the well-known cascade cycle in which refrigeration is provided by three different refrigerant loops. One such cascade cycle uses methane, ethylene, and propane cycles in sequence to produce refrigeration at three different temperature levels. Another well-known refrigeration cycle uses a propane pre-cooled, mixed refrigerant (C3MR) cycle in which a multicomponent refrigerant mixture generates refrigeration over a selected temperature range. The mixed refrigerant may contain hydrocarbons such as methane, ethane, propane, and other light hydrocarbons, and also may contain nitrogen. Versions of this refrigeration system are used in many operating LNG plants around the world.

These and other types of refrigeration processes for natural gas liquefaction involve the use of refrigerant compressors driven by gas turbines. In recent years, single-shaft gas turbines have been used for this purpose. During a blocked compressor discharge event, the compressed refrigerant typically is discharged to a flare system, which must be sized to handle anticipated relief flows during such an event. There also are other systems in the prior art, some of which are discussed below.

The term "baseload LNG plant" as used herein is intended to mean a facility that continuously produces liquefied natural gas via refrigeration from at least one of the many cooling process cycles known in the art. The facility may be a land-based site, a floating production, storage, and off-loading (FPSO) facility to recover natural gas from the sea/ocean floor, or a gravity-based system (GBS), a FPSO site that is anchored to the sea floor in a particular location.

Persons skilled in the art will understand that the net power available from a gas turbine used to drive a refrigerant compressor in a baseload LNG plant is a function of several variables, including but not limited to ambient temperature (the most power is available at cold temperatures), inlet/outlet duct losses, frictional losses, compressor fouling over time, etc.

U.S. Pat. No. 4,799,359 (Nicoll) discloses a cryogenic refrigeration compressor containing an externally adjustable relief valve between the compressor discharge and the suction lines. This allows cryogenic fluid to flow from the compressor discharge to the suction line when the discharge pressure exceeds a set value.

U.S. Pat. No. 4,566,885 (Haak) discloses a liquefaction process with two closed loop refrigeration cycles. In each loop, the compressors are driven by a gas turbine. At times of low power consumption by the compressors at the first loop, turbine power is diverted to a generator. The generator supplements the power generated by the turbine of the second loop.

International Publication WO 88/06674 discloses a process, applicable to FPSO and stationary platforms, to relieve high pressure gas discharge to the sea floor. Any low and/or medium pressure gas is discharged through a conventional flare. This reduces the necessary diameter and length of the flare extending from the platform.

International Publication WO 97/33131 discloses a liquefied natural gas process characterized by coolant loop compressors being mechanically interconnected and driven by a single-shaft gas turbine. Also disclosed is a bypass valve between the inlet and outlet of each compressor for use during process start-up.

U.S. Pat. No. 5,408,840 (Talley) discloses a refrigerant recovery process. In the event of refrigeration circuit overpressure, the refrigerant, after passing through the pressure relief valve, is collected in a vessel rather than being vented to the atmosphere.

U.S. Pat. No. 5,319,945 (Bartlett) discloses a process where, in the event of overpressure, refrigerant is diverted from the refrigeration loop to a holding vessel. The volume of the holding vessel must be large enough to reduce the overpressure before a relief vent set pressure is reached.

U.S. Pat. No. 3,855,810 (Simon et al.) discloses the insertion of a sufficient buffer volume on the low-pressure side of a refrigeration circuit to accommodate the build-up in pressure when the compressor is cut-off. This eliminates the need to flare refrigerant through pressure relief valves.

As described above, most refrigerant compressors used in baseload LNG plants are driven by gas turbines. In many applications, single shaft gas turbines are used wherein the gas turbine and one or more compressors or compressor stages are mounted on a single shaft. If the compressor discharge is blocked by an unexpected process event, the compressed refrigerant typically is discharged to a piping and flare system, which must be sized to handle anticipated relief flows during such an event. It is desirable to minimize the size of the piping and flare system required to handle such flows. It also may be desirable for economic and environmental reasons to minimize the amount of gas flared during process upsets or compressor discharge blockage events.

Embodiments of the present invention address these needs and include an apparatus and method for minimizing relief flows in baseload plants for the production of liquefied natural gas (LNG), relating in particular to an apparatus and method which take advantage of the bogdown characteristics of single-shaft gas turbines used to drive refrigerant compressors in order to minimize flare loading during a blocked compressor discharge event.

BRIEF SUMMARY OF THE INVENTION

Embodiments of the present invention relate to an apparatus and method for the operation of a refrigeration system wherein one or more refrigeration compressors are driven by a single-shaft gas turbine. The apparatus and method may be applied to the production of LNG.

A first embodiment of the invention is an apparatus for regulating a driver driving a gas compressor having a gas inlet and a gas outlet, wherein the driver has a maximum power, which apparatus comprises a recycle pressure relief device in fluid communication with the gas outlet, the recycle pressure relief device adapted to receive a stream of a compressed gas having a discharge pressure from the gas outlet, and a conduit in fluid communication with the gas inlet.

The gas inlet receives at least a portion of the stream of the compressed gas transmitted to the conduit from the recycle pressure relief device when the discharge pressure reaches a designated pressure. The driver is a gas turbine and at least a portion of the compressed gas is a refrigerant.

The apparatus also includes at least one additional recycle pressure relief device in fluid communication with the gas outlet, the additional recycle pressure relief device adapted to receive an additional stream of the compressed gas from the gas outlet.

The at least a portion of the stream of the compressed gas may be transmitted to the conduit from the recycle pressure relief device when the driver reaches a first designated percentage of the maximum power, and at least a portion of the additional stream of the compressed gas may be transmitted to the conduit from the additional recycle pressure relief device when the driver reaches a second designated percentage of the maximum power.

A second embodiment of the invention comprises a method for regulating a driver driving a gas compressor having a gas inlet and a gas outlet, the driver having a maximum power, which method comprises providing a recycle pressure relief device in fluid communication with the gas outlet, the recycle pressure relief device adapted to receive a stream of a compressed gas having a discharge pressure from the gas outlet, establishing a designated pressure for the discharge pressure, providing a conduit in fluid communication with the gas inlet, and transmitting at least a portion of the stream of the compressed gas to the conduit from the recycle pressure relief device when the discharge pressure reaches the designated pressure.

The method also includes providing at least one additional recycle pressure relief device in fluid communication with the gas outlet, the additional recycle pressure relief device adapted to receive an additional stream of the compressed gas from the gas outlet and transmitting at least a portion of the additional stream of the compressed gas to the conduit when the discharge pressure reaches the designated pressure.

The at least a portion of the stream of the compressed gas is transmitted to the conduit from the recycle pressure relief device when the driver reaches a first designated percentage of the maximum power, and at least a portion of the additional stream of the compressed gas is transmitted to the conduit from the additional recycle pressure relief device when the driver reaches a second designated percentage of the maximum power.

A third embodiment of the invention relates to a gas compression system comprising a driver; a refrigerant compressor driven by the driver and having an inlet and an outlet; a relief pressure safety valve having an inlet in flow communication with the outlet of the compressor, an outlet, and a set point; and a recycle pressure safety valve having an inlet in flow communication with the outlet of the compressor, and an outlet in flow communication with the inlet of the compressor.

The recycle pressure safety valve has a set point that is lower than the set point of the relief pressure safety valve.

The gas compression system may further comprise an additional compressor driven by the driver and having an inlet and an outlet, wherein the inlet is adapted to receive gas from the outlet of the additional compressor; a relief pressure safety valve having an inlet in flow communication with the outlet of the additional compressor, an outlet, and a set point; and a recycle pressure safety valve having an inlet in flow communication with the outlet of the additional compressor, and an outlet in flow communication with the inlet of the additional compressor.

The recycle pressure safety valve has a set point that is lower than the set point of the relief pressure safety valve.

The gas compression system may further comprise an additional recycle pressure safety valve having an inlet in flow communication with the outlet of the compressor, an outlet in flow communication with the inlet of the compressor, and a set point that is lower than the set point of the relief pressure safety valve, wherein the driver is a gas turbine having a maximum power.

The recycle pressure safety valve is adapted to open when the gas turbine reaches a first percentage of its maximum power, and the additional recycle pressure safety valve is adapted to open when the gas turbine reaches a second percentage of its maximum power that is greater than the first percentage of its maximum power.

A fourth embodiment of the invention includes a method of operating a refrigerant compressor driven by a single-shaft gas turbine comprising (a) providing a compression system including
 (1) a refrigerant compressor and a single-shaft gas turbine adapted to drive the refrigerant compressor, wherein the refrigerant compressor has an inlet and a discharge line leading to a compressor outlet;
 (2) a relief pressure safety valve having an inlet in flow communication with the discharge line of the refrigerant compressor an outlet, and a set point; and
 (3) a recycle pressure safety valve having an inlet in flow communication with the discharge line of the refrigerant compressor, an outlet in flow communication with the inlet of the refrigerant compressor, and a set point that is lower that the set point of the relief pressure safety valve;
(b) blocking the compressor outlet;
(c) causing the recycle pressure safety valve to open and allowing compressed gas to flow to the inlet of the refrigerant compressor, thereby increasing the throughput of the refrigerant compressor, consuming all available power of the gas turbine, and causing the gas turbine to slow down; and
(d) causing the gas turbine to trip on low speed.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

Embodiments of the present invention relate to an apparatus and method to purposely cause a refrigerant compressor used in the production of LNG to consume all the available power of a single-shaft gas turbines (SSGT) driving the refrigerant compressor during a blocked discharge event. The goal is to bog down the SSGT and trip it off on a low speed warning before the mechanical design pressure (flare relief setting) is reached.

The primary benefit of the invention is reduced capital costs for the LNG plant. For example, the diameter and length of the cryogenic piping used in the flare system of the LNG plant may be reduced, and the height of the flare stack may be shortened. In addition, the amount of gas flared may be reduced, thereby realizing economic and environmental benefits.

Single-shaft gas turbines (SSGT) (e.g., GE Frame 7EA) are being used to drive refrigerant compressors in existing baseload LNG plants and are being considered for future plants. A characteristic of the SSGT is that it slows down or bogs down in response to a power imbalance between the available power of the unit and the power required by the process. The bogdown of a SSGT is unique in that it is a positive feedback event. When the machine begins to bog down, the air compressor delivering combustion air to the gas turbine also slows down since it is on the same shaft. Thus, less combustion air is available to the gas turbine, which leads to less delivered power, and the event propagates until the gas turbine trips on low speed.

In view of this bogdown characteristic, the recycle relief system of the present invention can eliminate a blocked compressor discharge as the controlling event that traditionally sizes the flare header for a natural gas liquefaction plant. This is often estimated as the maximum refrigerant flow rate in the system or the maximum throughput of the compressor (the stonewall point.) The gas bypass/recycle stream moves the operating point of the compressor to the right, lowering the compression ratio. The suction pressure and mass flow rate can be raised until the compressor is operating near the stonewall point.

Figure 1:
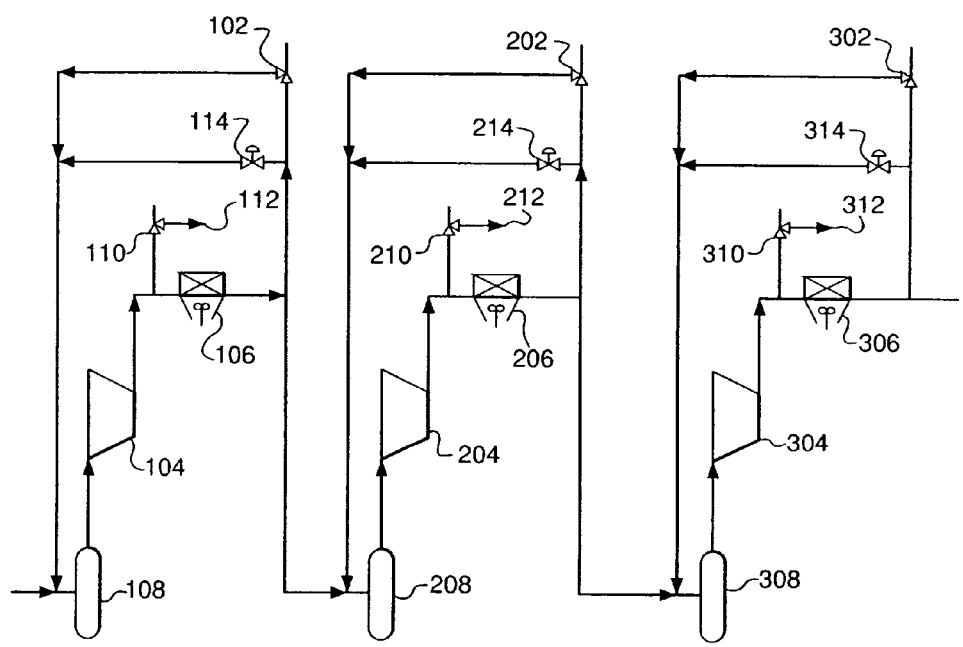
FIG. 1 is a schematic flow diagram illustrating one embodiment of the present invention.

A first embodiment of the invention is illustrated in FIG. 1. In each stage, a fixed recycle pressure safety valve (PSV) (102, 202, 302), which may be located at the discharge of the compressor (104, 204, 304) or downstream of the aftercooler (106, 206, 306), pipes compressed gas back to an optional suction drum (108, 208, 308). In FIG. 1, a recycle PSV is located downstream of the aftercooler in each stage, and compressed refrigerant is transmitted to the optional suction drum. Each recycle PSV has a lower set point than the relief PSV (110, 210, 310) which is open during a blocked discharge event.

Figure 2:
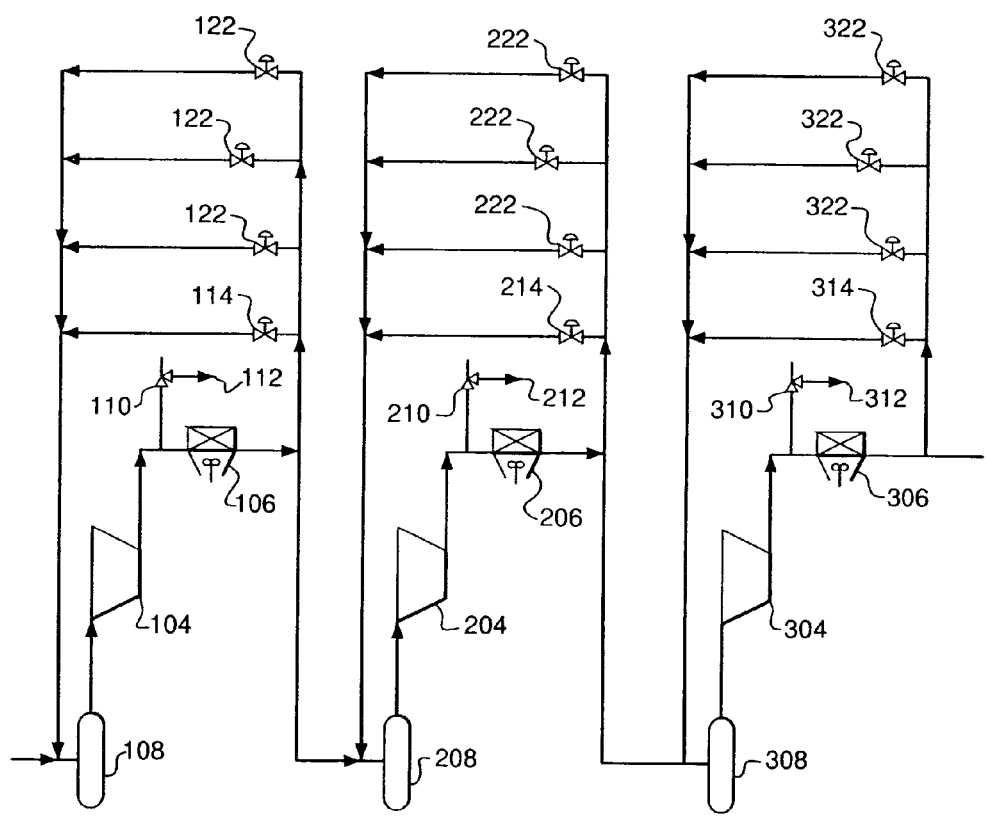
FIG. 2 is a schematic flow diagram illustrating another embodiment of the present invention.

Embodiments of the present invention may utilize one or more stages, although it is illustrated in embodiments having three stages in FIGS. 1 and 2. Also, some of the elements in the embodiments shown in FIGS. 1 and 2 are optional, including the aftercooler (106, 206, 306), the suction drum (108, 208, 308), the relief PSV (102, 202, 302) in FIG. 1 and the recycle pressure relief valves (122, 222, 322) in FIG. 2. For example, in one variation wherein there is no suction drum, the recycle PSV (102, 203, 302) pipes material directly back to the inlet of the compressor (104, 204, 304).

During a blocked discharge event, the mass flow rate of refrigerant through the compressor (104, 204, 304) increases, thus consuming more power. When the power required by the refrigeration compressors exceeds the available power of the gas turbine and optional helper motor/steam turbine (not shown), the gas turbine will begin to bog down. The recycle PSV (102, 202, 302) in each stage is sized so that the gas turbine bogs down and trips on low speed before the set pressure to the flare system (112, 212, 312) is reached. This eliminates the need to size the flare system in response to a blocked refrigerant compressor event. The recycle PSV in each stage can also serve as back-up to the anti-surge valves (114, 214, 314).

Figure 4:
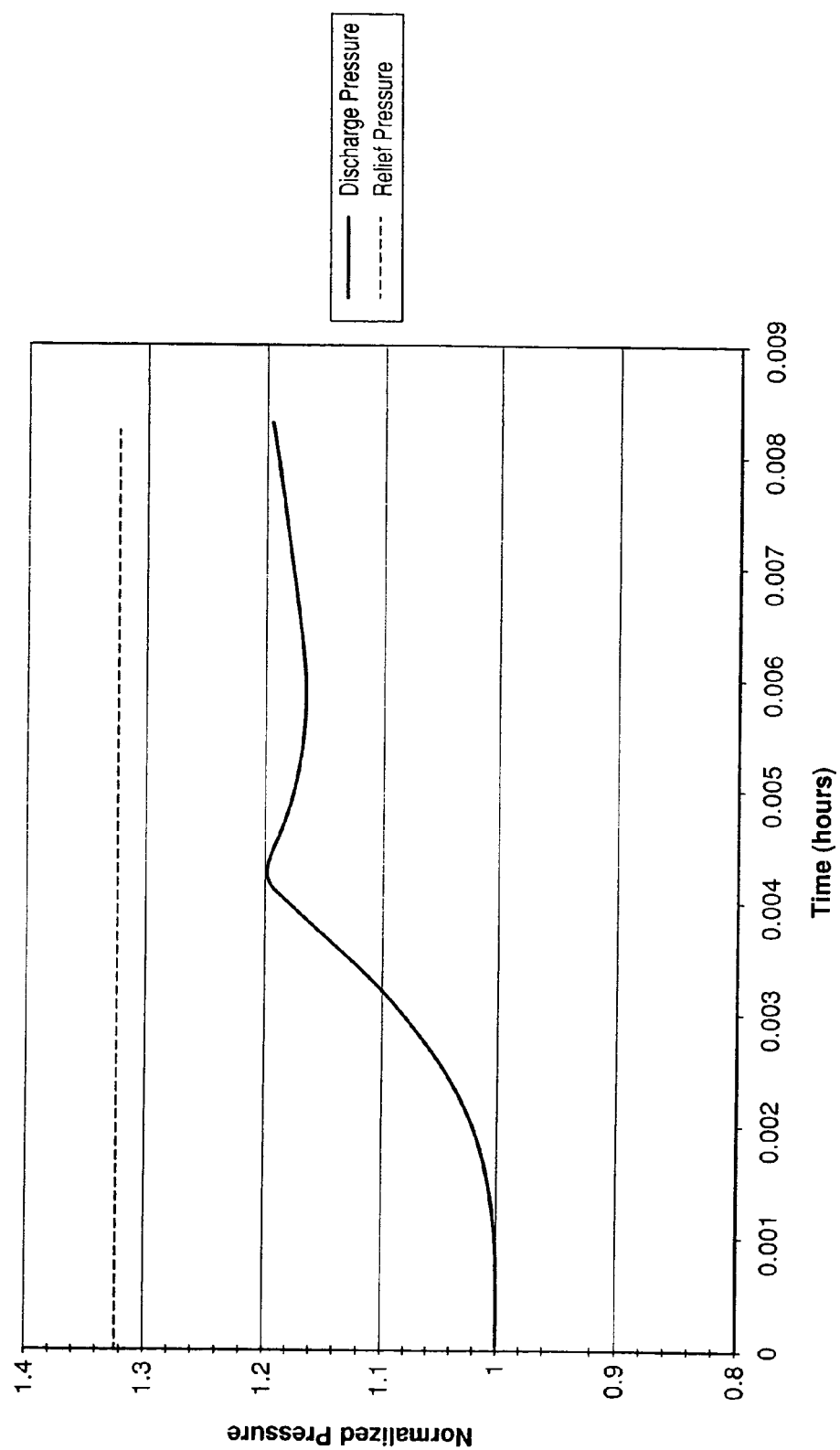
FIG. 4 is graph illustrating the discharge pressure from a compressor during a blocked discharge event in a system using the present invention.

There are several ways to arrive at a designated pressure for the discharge pressure at which the recycle PSV (102, 202, 302) opens and compressed gas is transmitted to the gas inlet of the compressor (104, 204, 304). For example, during a blocked discharge event, the recycle PSV may be opened just as the compressor enters surge. At the point of surge, the system will have a certain pressure that is a function of several variables, which will be different in every LNG plant. The key variables are the compressor performance curves, system volume, and safety constraints. Alternatively, the recycle valve may be opened at a pressure that does not correlate with the surge point of the compressor. This may be needed to ensure that the gas turbine trips off on low speed before a selected safety constraint is reached. Such a safety constraint may be, for example, that the maximum pressure attained during the event cannot exceed 92% of the flare relief mechanical design pressure. The selected safety constraint or constraints will differ on a case-by-case basis. For example, in the Example discussed below, there is a safety constraint that the final circuit pressure must be less than 95% of the flare relief pressure, as shown in FIG. 4.

Existing anti-surge valves may not be suitable for relief recycle applications because the anti-surge valves are sized specifically to handle flow rates necessary to keep the compressor away from the surge limit (low flow). Similarly, the anti-surge controllers are often tuned to keep the compressor out of surge, and not necessarily to bog the machine down.

In a variation of the first embodiment, each recycle PSV (102, 202, 302) can be replaced with an automatic or manual control valve (CV) sized for the same function as each recycle PSV shown in the first embodiment.

Another embodiment of the invention is illustrated in FIG. 2. As shown, a series of parallel recycle pressure relief valves (122, 222, 322) (PSV, CV, or a combination thereof) can be used instead of a single valve. This series of valves may be staged to open at set percentages of the maximum available gas turbine power (e.g., design value) and/or at set percentages of the flare relief pressure. For example, the first recycle pressure relief valve may open when the gas turbine reaches 75% of maximum power; the second recycle pressure relief valve may open when the gas turbine reaches 85% of maximum power; and the third recycle pressure relief valve may open when the gas turbine reaches 95% of maximum power. Multiple staged recycle pressure relief valves allow an extra degree of flexibility and safety to ensure that, during a blocked compressor discharge, the gas turbine will indeed bog down and trip off on low speed before the flare relief valve opens.

In yet another embodiment of the invention, cooling elements are installed in each recycle line to increase fluid density. This increases the mass flow rate through the compressor, thereby consuming available power more quickly.

The present invention also can be beneficial when a LNG plant is running at turndown. If a blocked compressor discharge event occurs at lower production levels, the invention will trigger a less severe relief situation, such as, for example, a shell relief scenario that occurs when the outlet of the main LNG heat exchanger is blocked.

The present invention also may be used with a multistage compressor. For a n-stage compressor housed within a single casing (e.g., propane compressor in a C3MR liquefaction cycle), the recycle pressure relief valve downstream of the compressor can pipe discharge gas back to any of the suction drums, individually or in combination. It is preferable to recycle the discharge gas to the first stage suction drum so that the gas must travel through the entire n-stage compressor, thereby consuming more power.

The present invention also may reduce the severity of the relief scenario when the cooling water is lost to the propane desuperheater in the C3MR liquefaction cycle.

EXAMPLE

An embodiment of the invention as operated according to FIG. 1 is illustrated for a situation in which anti-surge valve 114 fails to operate. The following process steps occur:

(1) At time=0.0005 hrs, a blockage of the discharge of compressor 104 is simulated.

(2) At time=0.0041 hrs, compressor 104 is about to enter surge. Recycle PSV 102 opens and compressed gas flows back to suction drum 108.

(3) At time=0.0061 hrs, recycling refrigerant material flowing back to the suction drum and increasing the throughput of compressor 104 consumes all the available power of the gas turbine. The gas turbine begins to slow (bog) down.

(4) At time=0.0083 hrs, the gas turbine reaches its specified low speed trip warning and the simulation stops. The gas turbine trips on low speed before the flare relief pressure is reached, and thus relief PSV 110 does not open.

Figure 3:
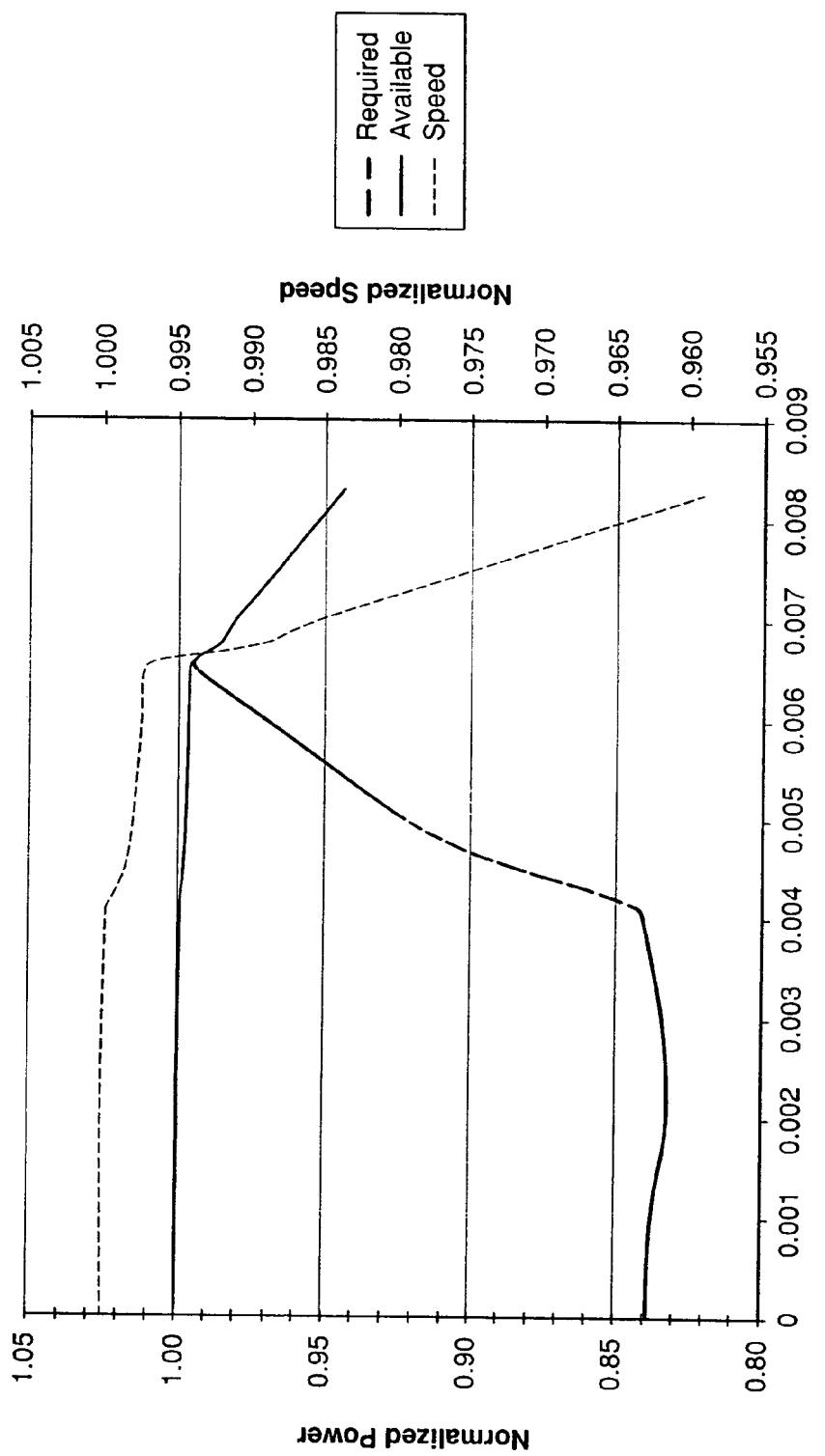
FIG. 3 is a graph illustrating a simulation result of bogdown of a single-stage gas turbine.

FIG. 3, which is a simulation result of bogdown of a SSGT, shows the power consumed by compressors 104 and 204 during the simulation, the power of the gas turbine, and speed of the gas turbine. As shown in FIG. 3, the speed drops off very rapidly when all the available power of the gas turbine has been consumed. The data ends at the point the gas turbine reaches its low speed trip, prompting a shutdown of the gas turbine to begin. In order to achieve this result, the dedicated recycle PSV must be sized properly.

FIG. 4 shows the discharge pressure of compressor 104 during a blocked discharge event. Without using the present invention, the pressure would have continued to rise at 0.0045 hours toward the relief pressure to flare set at a pressure represented by the dashed line in FIG. 4, thereby requiring PSV 110 to be opened. In this scenario, the flare system would have to be sized to handle the total compressor discharge flow. Using the present invention, however, it is possible to force the shutdown of the gas turbine before the relief pressure to flare is reached and PSV 110 is opened. FIG. 4 shows the pressure initially rises and then decreases as the recycle PSV 102 is opened, and the pressure does build up again over time. However, as the pressure rebuilds in the circuit, bogdown occurs and the gas turbine reaches its low speed setting without the relief PSV 110 opening to flare system 112.

Although illustrated and described herein with reference to certain specific embodiments, the present invention is nevertheless not intended to be limited to the details shown. Rather, various modifications may be made in the details within the scoop and range of equivalents of the claims and without departing from the spirit of the invention.

The invention claimed is:

1. An apparatus for regulating a driver driving a gas compressor having a gas inlet and a gas outlet, wherein the driver has a maximum power, which apparatus comprises:
   a recycle pressure relief device in fluid communication with the gas outlet, the recycle pressure relief device adapted to receive a stream of a compressed gas having a discharge pressure from the gas outlet;
   a conduit in fluid communication with the gas inlet, whereby the gas inlet receives at least a portion of the stream of the compressed gas transmitted to the conduit from the recycle pressure relief device when the discharge pressure reaches a designated pressure, wherein the driver is a gas turbine and at least a portion of the compressed gas is a refrigerant; and
   at least one additional recycle pressure relief device in fluid communication with the gas outlet, the additional recycle pressure relief device adapted to receive an additional stream of the compressed gas from the gas outlet;
   wherein the at least a portion of the stream of the compressed gas is transmitted to the conduit from the recycle pressure relief device when the driver reaches a first designated percentage of the maximum power, and at least a portion of the additional stream of the compressed gas is transmitted to the conduit from the additional recycle pressure relief device when the driver reaches a second designated percentage of the maximum power.

2. A method for regulating a driver driving a gas compressor having a gas inlet and a gas outlet, the driver having a maximum power, which method comprises:
   providing a recycle pressure relief device in fluid communication with the gas outlet, the recycle pressure relief device adapted to receive a stream of a compressed gas having a discharge pressure from the gas outlet;
   establishing a designated pressure for the discharge pressure;
   providing a conduit in fluid communication with the gas inlet;
   transmitting at least a portion of the stream of the compressed gas to the conduit from the recycle pressure relief device when the discharge pressure reaches the designated pressure;
   providing at least one additional recycle pressure relief device in fluid communication with the gas outlet, the additional recycle pressure relief device adapted to receive an additional stream of the compressed gas from the gas outlet; and
   transmitting at least a portion of the additional stream of the compressed gas to the conduit when the discharge pressure reaches the designated pressure;
   wherein the at least a portion of the stream of the compressed gas is transmitted to the conduit from the recycle pressure relief device when the driver reaches a first designated percentage of the maximum power, and at least a portion of the additional stream of the compressed gas is transmitted to the conduit from the additional recycle pressure relief device when the driver reaches a second designated percentage of the maximum power.

3. A gas compression system comprising
   (a) a driver;
   (b) a refrigerant compressor driven by the driver and having an inlet and an outlet;
   (c) a relief pressure safety valve having an inlet in flow communication with the outlet of the compressor of (b), an outlet, and a set point; and
   (d) a recycle pressure safety valve having an inlet in flow communication with the outlet of the compressor of (b), an outlet in flow communication with the inlet of the compressor of (b), and a set point that is lower than the set point of the relief pressure safety valve of (c).

4. The gas compression system of claim 3 further comprising
   (e) an additional compressor driven by the driver and having an inlet and an outlet, wherein the inlet is adapted to receive gas from the outlet of the compressor of (b);
   (f) a relief pressure safety valve having an inlet in flow communication with the outlet of the additional compressor of (e), an outlet, and a set point; and
   (g) a recycle pressure safety valve having an inlet in flow communication with the outlet of the compressor of (e), an outlet in flow communication with the inlet of the compressor of (e), and a set point that is lower than the set point of the relief pressure safety valve of (f).

5. The gas compression system of claim 3 further comprising an additional recycle pressure safety valve having an inlet in flow communication with the outlet of the compressor of (b), an outlet in flow communication with the inlet of the compressor of (b), and a set point that is lower than the set point of the relief pressure safety valve of (c), wherein the driver is a gas turbine having a maximum power, wherein the recycle pressure safety valve of (d) is adapted to open when the gas turbine reaches a first percentage of its maximum power, and wherein the additional recycle pressure safety valve is adapted to open when the gas turbine reaches a second percentage of its maximum power that is greater than the first percentage of its maximum power.

6. A method of operating a refrigerant compressor driven by a single-shaft gas turbine comprising
 (a) providing a compression system including
  (1) a refrigerant compressor and a single-shaft gas turbine adapted to drive the refrigerant compressor, wherein the refrigerant compressor has an inlet and a discharge line leading to a compressor outlet;
  (2) a relief pressure safety valve having an inlet in flow communication with the discharge line of the refrigerant compressor an outlet, and a set point; and
  (3) a recycle pressure safety valve having an inlet in flow communication with the discharge line of the refrigerant compressor, an outlet in flow communication with the inlet of the refrigerant compressor, and a set point that is lower that the set point of the relief pressure safety valve;
 (b) blocking the compressor outlet;
 (c) causing the recycle pressure safety valve to open and allowing compressed gas to flow to the inlet of the refrigerant compressor, thereby increasing the throughput of the refrigerant compressor, consuming all available power of the gas turbine, and causing the gas turbine to slow down; and
 (d) causing the gas turbine to trip on low speed.

* * * * *